United States Patent [19]
Dukes et al.

[11] 4,388,652
[45] Jun. 14, 1983

[54] SYNCHRONIZED, VARIABLE SPEED CAPSTAN MOTOR DRIVE SYSTEM FOR FACSIMILE RECORDER

[75] Inventors: Allen E. Dukes, West Melbourne; David C. Bailey, Cocoa Beach, both of Fla.

[73] Assignee: Harris Corporation, Melbourne, Fla.

[21] Appl. No.: 34,975

[22] Filed: Apr. 30, 1979

[51] Int. Cl.³ .................... H04N 1/10; H04N 1/12
[52] U.S. Cl. ................................ 358/285; 358/293; 358/296
[58] Field of Search ............... 358/285, 215, 289, 292, 358/293, 296, 302

[56] References Cited

U.S. PATENT DOCUMENTS

| | | | |
|---|---|---|---|
| 3,781,902 | 12/1973 | Shim et al. | 358/289 |
| 3,886,309 | 5/1975 | Mason | 358/293 |
| 3,922,485 | 11/1975 | Starkweather et al. | 358/285 |
| 3,938,191 | 2/1976 | Jarmy | 358/289 |
| 3,970,781 | 7/1976 | Dalton et al. | 358/289 |
| 4,028,732 | 6/1977 | Salter et al. | 358/289 |

OTHER PUBLICATIONS

Schrieber et al.–Laser Scanner/Recorder for Image Transmission and Computer Processing–SPIE, vol. 66 (1975), Efficient Trans. of Pict. Info., pp. 182-189.

Primary Examiner—Joseph A. Orsino, Jr.
Attorney, Agent, or Firm—Antonelli, Terry & Wands

[57] ABSTRACT

A system synchronously controls the advance of a recording medium or may be employed in a facsimile recording apparatus in which a modulated optical information beam is caused to scan or be swept across the recording medium as the medium is advanced in a stepwise manner. For this purpose, digital control circuitry including a programmable read only memory responds to a galvanometer synchronization signal, indicative of the beginning of a scan line, and selectively generates stepping motor advance signals in accordance with a look-up table stored in the memory as the beam scans the recording medium. By this action, the location in each successively recorded line at which the recording medium is stepwise-advanced is aligned in the direction of movement of the recording medium with a corresponding advance location for every other line irrespective of the rate of advance of the medium. As a result, banding, which would otherwise contribute to degradation in the recorded image copy, is effectively eliminated.

14 Claims, 4 Drawing Figures

SYNCHRONIZED, VARIABLE SPEED CAPSTAN MOTOR DRIVE SYSTEM FOR FACSIMILE RECORDER

FIELD OF THE INVENTION

The present invention is directed to facsimile reproduction equipment and is especially concerned with a control and drive arrangement for a facsimile recorder.

BACKGROUND OF THE INVENTION

The development of photographic recording systems has seen the introduction of more precise data transmission and reproduction equipment such as laser recording devices, using acoustic-optic modulator components. An example of such a laser facsimile recorder is described in the U.S. Pat. No. 3,997,722 to Bardos. In this type of system, information to be recorded in the form of a photographic image is modulated onto a recording laser beam as the beam is scanned across a moving photographic recording medium, such as sensitized paper or film. The overall photographic image is comprised of a set of substantially parallel lines the widths of which vary as the intensity of beam is modulated during its sweep across the film. The incidence of the beam on the film is controlled by a mirror galvanometer arrangement that deflects the modulated beam to form each line scan or trace across the film as the film is driven by the film drive system.

For the purpose of driving the film during the recording of each line trace, stepping motors have been found to be particularly useful as their control is readily compatible with signals produced by digital processing circuitry that is customarily employed in present day data processing and recording systems. During the recording of each line or trace across a prescribed width of the film that defines the width of the image to be formed, the stepping motor is clocked or advanced a plurality of times, to thereby form a stepwise linear trace or line. Although this type of film advance arrangement is preferred because of its system compatibility and precise film advance control, it has suffered from the drawback of introducing into the recorded image one or a series of imperfections called bands.

More specifically, and with reference to FIG. 1 of the drawings, there are shown a plurality of lines, such as those formed by a conventional laser facsimile system described in the above referenced patent, that form part of the overall recording image. (Only four lines are shown in order to simplify the illustration and to facilitate its description). As shown in FIG. 1, the X or horizontal direction represents the direction in which the recording optical beam, e.g. a galvo-mirror deflected line beam, is moved, while the vertical or Y direction corresponds to the direction in which the photographic recording medium is advanced by the stepping motor.

Looking at trace 1, for example, as the recording beam is deflected across the surface of the recording medium, the film is advanced incrementally, at beam deflection points 1a, 1b, 1c, 1d by the stepping drive motor, so that there is recorded a stepwise diagonal line trace across the width of the recording medium. Subsequent lines or traces 2, 3 and 4 are shown as being incrementally advanced at deflection points 2a, 2b-3a, 3b-- etc. as each new line is begun and the beam is deflected as the recording medium is stepwise advanced. Due to lack of precise synchronization, the points at which successive lines are stepwise-advanced by the stepping motor are offset in the direction of deflection of the galvoscanning mirror arrangement, so that there is created a composite series of bands which extend diagonally across the paper and which constitute degradation of the image copy. Ideally, the points at which the film or paper is advanced (which points are, in reality, smoothed somewhat by the behavior of the film advance motor which does not actually produce sharp transition in the recorded lines) should be the same for each successive line, so that these points are aligned in the vertical or Y direction, as opposed to being diagonally offset as shown in FIG. 1. Efforts to reduce banding have included the use of very precise gear train arrangements between the drive motor and the recording medium roller mechanism. Unfortunately, the tolerances required to provide the necessary synchronization accuracy make this approach prohibitively expensive.

In addition, with conventional systems, synchronous control of the stepped advance of the recording medium for changes in resolution of the recorded image without suffering a marked distortion or boundary within the image has not heretofore been achieved.

SUMMARY OF THE INVENTION

It is, therefore, an object of the present invention to provide an improved film advance arrangement for a facsimile recording system, in which the synchronous recording of each scan line is achieved so as to eliminate the above-described problem of banding.

It is a further object of the present invention to eliminate the banding phenomenon in a facsimile recording system without the need for expensive gearing components; the present invention is advantageously suited for use with inexpensive capstan drive coupler elements such as belt and pulley components.

It is an additional object of the present invention to provide a film advance arrangement for a facsimile recording system, wherein the film advance speed may be varied without suffering misalignment of film step inflections in the lines on the copy medium.

Pursuant to the present invention the step motor, which is used to drive a belt-pulley arrangement that is coupled to the film advance roller, is synchronously clocked or stepped from the beginning of each line or trace to be mutually aligned and which make up a multi-lined laser recorded image. Digital signal control circuitry which is employed for this purpose includes a programmable read only memory (PROM), multiplier logic configuration that responds to a prescribed timing signal representative of the beginning of new line or trace and produces the necessary film advance rate for causing a film advance stepping motor to be synchronously controlled, so that the location of paper or film advance for each line or trace is properly aligned in the direction of advance of the recording medium for every other scan line.

DETAILED DESCRIPTION

Figure 1:
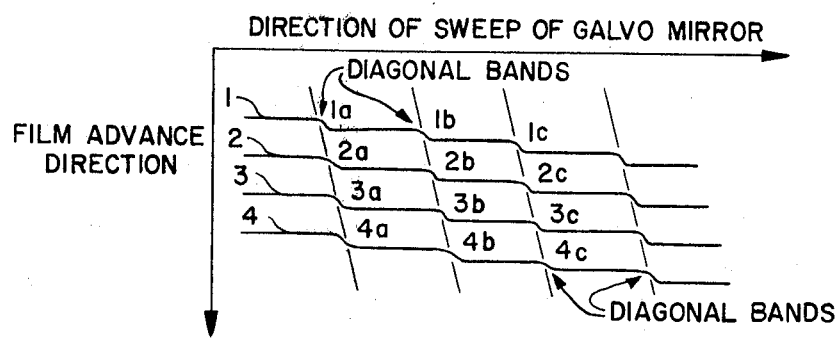
FIG. 1 is an illustration of a portion of a multi-lined facsimile recording in which successive lines are relatively offset, producing banding.
Figure 2:
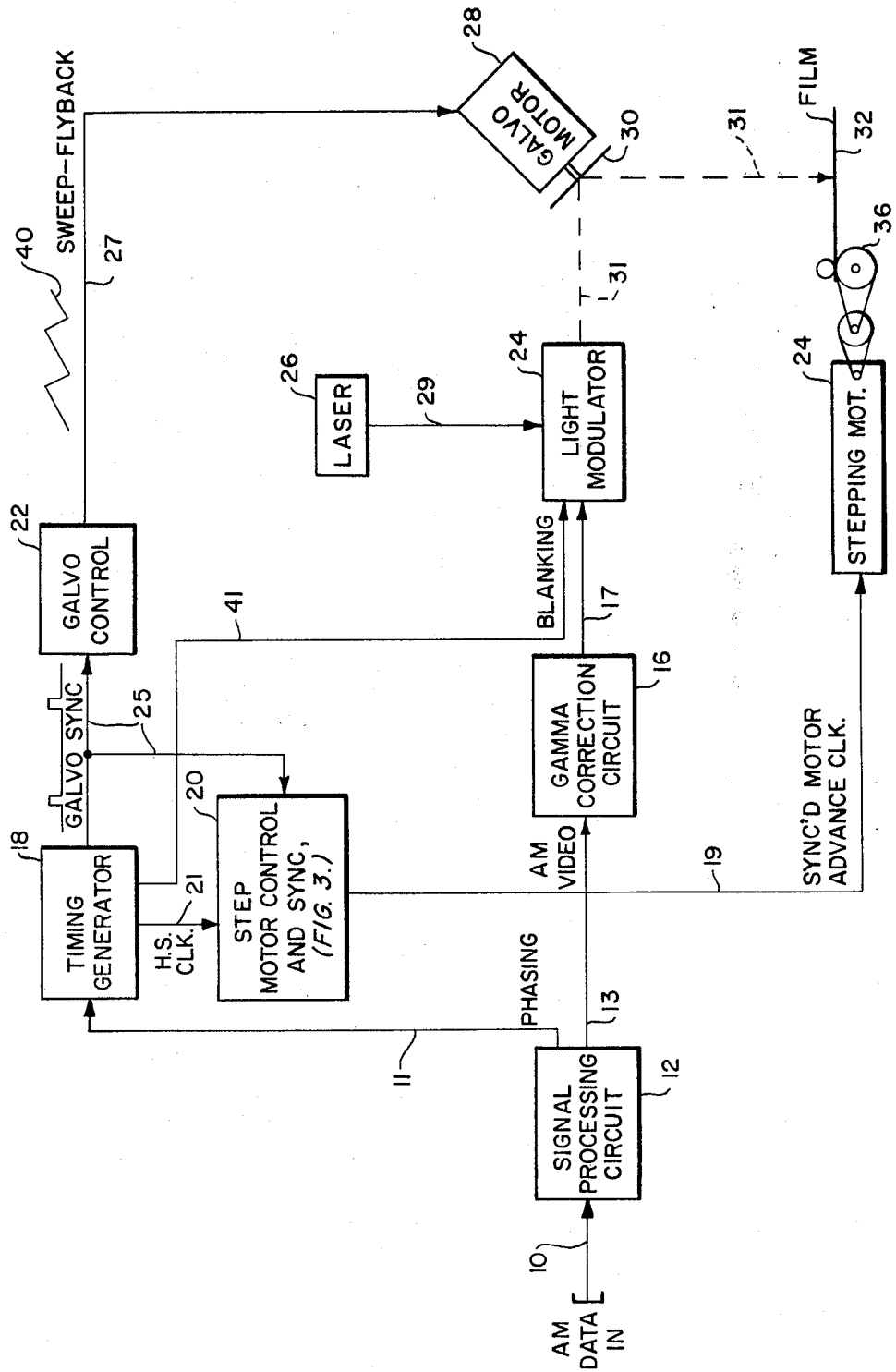
FIG. 2 is a block diagram of a facsimile recording system employing the stepping motor film advance synchronization and motor control arrangement according to the present invention.

Referring now to FIG. 2, there is shown a block diagram of a facsimile recording system into which the present invention is incorporated. Although the various video signal processing components, per se, shown in FIG. 1, are not the subject matter of the present invention, they will be described briefly in conjunction with the overall system in order to facilitate an understanding of the general system environment.

Shown at 10 is an input signal line over which amplitude modulated video signals representative of sequential lines of information to be recorded are supplied. These signals may be those representing geographical data as produced by satellite weather mapping units, printed documents, etc. The source of the video signals that may be employed as the input signal is unimportant, as long as it is understood that the signal format is one derived from a line-by-line recording scanner, wherein each line signal produced may contain, in addition to the AM video, initial start and phasing signals, employed for designating the beginning of a line of video data. The signals coupled over line 10 are demodulated and separated into separate phasing and video information components by a signal processing circuit 12, which effectively demodulates the AM video down to baseband and couples the video over line 13 to gamma correction circuit 16, while coupling the phasing signals over line 11 to a timing generator 18. Gamma correction circuit provides appropriate correction of the video signals in accordance with the tone sensitivity of the recording medium to be used in recording and supplies the corrected video signal to modulation unit 24. Modulation unit 24 may include a suitable RF oscillator and mixer for placing the AM baseband video signal onto an RF carrier that is used to modulate an acousto-optic modulation (AOM) cell. The AOM cell is disposed in the beam path of the output beam 29 produced by laser 26 and modulates the intensity of beam 29 in accordance with the AM video. The undulation of the beam 29 and thereby the width of a scan line or trace is a function of the frequency of the RF carrier.

Modulation unit output beam 31 is directed onto a deflecting mirror 30 which is coupled to galvanometer motor 28. Mirror 30 is cyclically displaced by galvanometer motor 28, so that modulated output beam 31 from modulation unit 24 is deflected across a reading medium 32, such as sensitized photographic paper or film that is advanced by film capstan 36, as capstan 36 is caused to rotate in increments or steps by stepping motor 24. The drive and control circuitry for galvanometer motor 28 causes the mirror 30 to initiate a sweep or scan on one side of the film, linearly sweep across to the other side of the film, and then retrace or sweep back to the one side and begin a new scan. The time interval during which the retrace occurs is much shorter than the recording scan interval, as represented by timing signal 40 supplied over line 27 to galvanometer motor 28 from galvo drive circuit 22.

The sweep signal 40 produced by galvo-drive circuit 22 is basically controlled by a galvanometer synchronization clock signal derived by timing generator 18 in response to the phasing signal supplied over line 11. In conventional arrangements, such as the one described in the above reference U.S. patent, suitable combinational logic is coupled between line 11 and galvo-drive circuit 22 and drive motor 24 for approximately or generally causing galvo-motor 28 to reciprocate mirror 30 so that successive lines that make up an image are recorded on medium 32 as the recording medium is successively and incrementally advanced by stepping motor 24.

The portion of the configuration shown in FIG. 2 thus far described is basically what is employed in the prior art and suffers, as was pointed out above, from the problem of banding. The overall configuration shown in FIG. 2, a portion of which is shown in greater detail in FIG. 3, to be described below, accurately controls the clocking of stepping motor 24 in synchronization with each sweep or scan produced by mirror 30. For this purpose, a timing generator unit 18 and step motor control unit 20 are coupled between line 11, galvo-drive circuit 22 and stepping motor 24.

Timing generator 18 includes an internal clock and count down circuit which periodically generates a clock signal and locks the clock to the phasing signal supplied over line 11 from signal processing circuit 12. This clock consists of a pulse signal produced at the beginning of each line scan and is used to control the sweep and retrace or flyback operation of galvo-mirror 30. The pulse signal or galvanometer synchronization (galvo-sync) signal is supplied over line 25 to galvo-drive circuit 22 to cause galvo drive circuit 22 to generate the sawtooth scan control signal 40. Over line 41 timing generator 18 also produces a suitable blanking pulse, a prescribed time interval after the galvo-sync pulse, which may be coupled to light modulation unit 24 so as to quench the beam or otherwise prevent output beam 29 from laser 26 from impinging on film 32 during the retrace or flyback interval.

Figure 3:
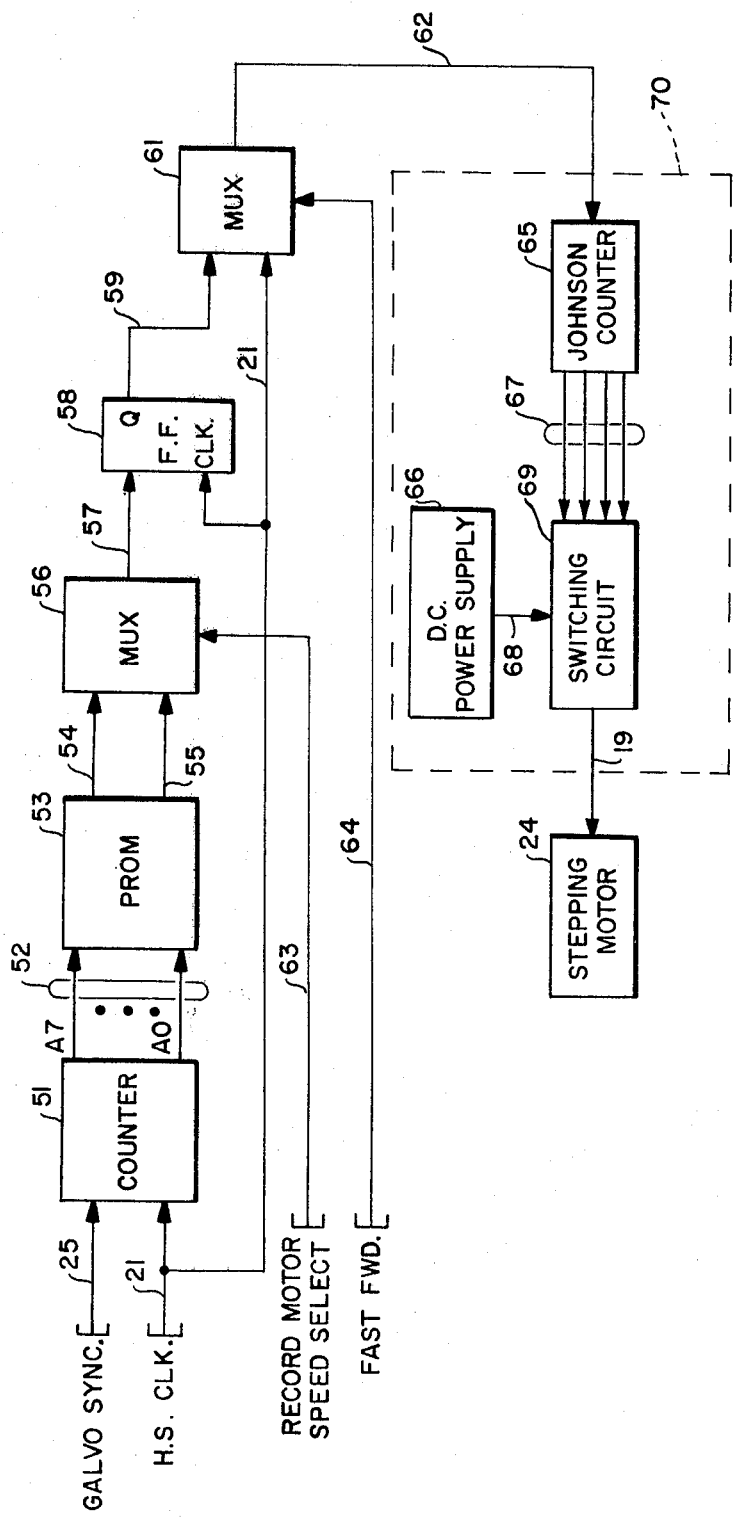
FIG. 3 is a detailed schematic block diagram of the synchronization and motor control portion of FIG. 2.

Pursuant to the present invention, timing operator 18 is further coupled to control circuitry corresponding to stepping motor control and synchronization unit 20, depicted in detail in FIG. 3, to which stepping timing or clock signals are supplied over line 21. The stepping motor control and synchronization circuit 20 accurately controls the stepping or advance of stepping motor 24 in relation to the scan position of beam 31 impinging on recording medium 32, so that the step position of each line trace is aligned in the direction of movement (the vertical or Y direction shown in FIG. 1) of recording medium 32, whereby the banding problem of the prior art is eliminated. Stepping motor control and synchronization circuit 20 also includes circuitry for permitting the stepping rate of motor 24 to be varied while ensuring proper alignment of the stepping locations of each successive line scan.

Referring now to FIG. 3 where the constituents components of the synchronization and motor control circuitry of the present invention are shown in detail, output line 25 from timing generator 18, shown in FIG. 2, is coupled to the count enable input of a counter 51. For purposes of the present description it is assumed that counter 51 is an eight bit counter, although a counter of a different bit capacity may be employed as design demands, without departing from the spirit of the present invention. The clock input to counter 51 is derived from an internal high speed (e.g. 250 Hz) clock contained within timing generator 18 over line 21. For each clock pulse of the high speed clock, the binary code value represented by the eight bit output lines 52 of counter 51 is incremented, once the counter has been enabled, and these successively produced codes are used to define successive addresses within a programmable read only memory (PROM) 53. PROM 53 contains a look-up table of stepping motor clocking signals to be produced in response to prescribed values of the binary codes coupled over address lines 52.

As was described previously, pursuant to the present invention, it is possible to synchronously control the stepping motor so that banding is eliminated for a multiplicity of step rates. For this purpose, PROM 53 has a plurality of outputs (two being shown in FIG. 3) corresponding to the number of different step rates that may be used during recording. In order to facilitate an understanding of the present invention, it will be assumed that the stepping motor may be advanced or clocked at two recording rates: a fast recording rate of eight steps/line, and a slow recording rate of four steps/line. It will also be understood that galvo-mirror 30 is caused to scan a complete line for every 256 of the clock pulses supplied over line 21. It should be understood, however, that these values do not necessarily represent actual parameters employed by the system, but have been chosen for explanatory purposes only. Thus, using the example chosen, for the higher recording step rate, the state of line 54, corresponding to the faster clock rate, will change state to produce a prescribed clock transition (e.g. low to high) eight times during a scan line. For the lower recording step rate, the state of line 55, corresponding to the slower clock rate, will change state to produce the prescribed clock transition (low to high) four times during a scan line. The four transitions produced on line 55 are produced simultaneously with every other prescribed clock transition on line 54 so that the higher speed and lower speed clocks are synchronized with each other.

Motor step rate lines 54 and 55 from PROM 53 are coupled to a first multiplexer 56, the output 57 of which is coupled to the set input of flip-flop 58. Flip-flop 58 is clocked by the 250 Hz clock on line 21. The Q output of flip-flop 58 is coupled over line 59 to a first input of a second multiplexer 61, a second input of which is coupled to the 250 Hz clock line 21. The output of multiplexer 61 is coupled over line 62 to a Johnson counter 65. The control inputs of multiplexers 56 and 61 are coupled to control lines 63 and 64, respectively. Lines 63 and 64 are coupled to the overall system control circuitry that supply command signals which govern system operation.

During recording, the logical state of line 64 is low, so that input line 59 of multiplexer 61 is coupled to output line 62. During non-record mode, line 64 goes high, switching output line 62 of multiplexer 61 to input line 21 over which the high speed (250 Hz) clock is supplied, to thereby advance the stepping motor and the recording medium. The line 64 is used, for example, for a rapid paper advance (fast forward mode). Similarly, during recording (the low state of line 63), one of lines 54 and 55 will be coupled by multiplexer 56 to output line 57 in accordance with the state of line 63. Line 63 is used to designate either the fast or the slow recording stepping rate for stepping motor 24.

For setting the proper motor speed, output line 62 is coupled to a suitable step motor drive circuit 70, the output of which is coupled to stepping motor 24. As shown in FIG. 3, motor drive circuit 70 contains a suitable multiple phase generating circuit (e.g. a Johnson counter) 65, the four output lines of which are coupled to a D.C. power switching circuit 69. Switching circuit 69 is comprised of a set of four power supply switches, such as power transistor switch circuits, each of which is coupled over line 68 to a suitable D.C. power source 66, and the control inputs of which are coupled to the respective ones of four phase output lines 67 from Johnson counter 65. The outputs of the switching circuits 69 are coupled to the appropriate multiphase input terminals of the stepping motor, in a customary manner, to drive the motor via the switched D.C. power supply. The output drive shaft of a stepping motor 24 may be coupled through a simple and inexpensive belt and pulley arrangement to the film advance capstan for incrementally moving the film.

OPERATION

As was discussed above, for purposes of the present description, it will be assumed that the stepping motor is to be selectively advanced at a higher stepping rate of eight steps/line or a lower stepping rate of four steps/line, and that the width of a line corresponds to 256 clock pulses counted by either bit counter 51.

Figure 4:
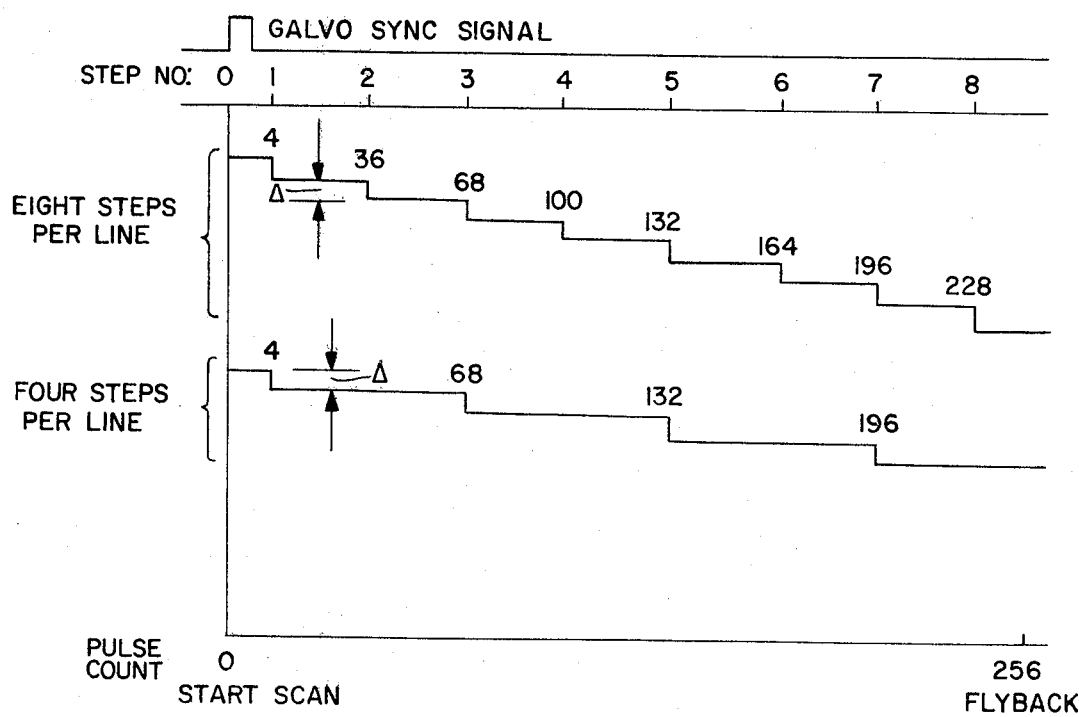
FIG. 4 is an illustration of a portion of an indexed multi-lined facsimile recording useful for explaining the operation of FIG. 3.

Let it be initially assumed that the resolution of the data being recorded is relatively low (such as printed text) so that the higher step rate for the stepping motor is to be used. Since the system is in the record mode, line 64 is low and, for the higher step rate, the state of line 63 will be such as to couple input line 54 of multiplexer 56 to its output line 57. FIG. 4 shows the relationship of the contents of counter 51 for the galvanometer-directed laser beam locations on recording medium 32 where the medium is advanced by stepping motor 24 in accordance with the synchronized clock output on line 62 from multiplexer 61.

Upon receipt of the galvo sync pulse supplied over line 25 to its enable (EN) input, counter 51 is cleared and then begins counting the high speed clock pulses supplied from the internal clock of timing generator 18 on line 21. The galvo sync pulse is also applied to galvo motor drive circuit 22 which begins generating the sweep portion of signal 40, causing galvo mirror 30 to scan beam 31 across the recording medium. As counter 51 is incremented by the high speed clock pulses, the address code on lines 52 changes and, eventually, as shown in FIG. 4, there will occur a code which causes the level on line 54 to change state. In FIG. 4, the first state change, which corresponds to a stepping motor advance pulse, is produced when the contents of counter 51 are the decimal value four or the binary address code 0000 0100. The output on line 54 is coupled via multiplexer 56 to the set input of flip-flop 58, the Q output of which is then appropriately clocked high by the high speed clock on line 21. The clocked Q output of flip-flop 58 is coupled through multiplexer 61 over line 62 to motor drive circuit 70. Motor drive circuit 70 responds to the signal on line 62 and steps the rotation of motor 24 by a prescribed incremental amount to cause stepwise advance of recording medium 32 by a prescribed Δ displacement, as shown in FIG. 4.

For the ensuing thirty-one high speed clock pulses counted by counter 51, the state of output line 54 of PROM is low, so that the galvo scan line continues horizontally in a continuous fashion across the recording medium 32, as depicted in FIG. 4. Upon the contents of counter 51 reaching the decimal value 36 (binary address code 0001 0100), output line 54 of PROM 53 again goes high and a new step pulse is clocked over line 62 to motor drive circuit 70, whereby the recording medium is advanced another distance Δ by motor 24. This process continues for subsequent counter decimal values 68, 100, 132, 164, 196 and 228, as shown in FIG. 4. Since, as was explained above, the image width on recording medium 32 is 256 pulses wide, the galvo-motor drive circuit 22 causes galvo motor 28 to return mirror 30 to the start-of-scan position on the medium at a time coincident with the generation of the two hundred fifty-sixth high speed clock pulse subsequent to the galvo sync pulse, namely, during the fly back or retrace interval of scan control signal 40. Thereafter, the next galvo sync pulse beginning a new line of data is applied over line 25 to the enable (EN) input of counter 51 and the above sequence of events is carried out for the new line.

The successive lines of data at the high step rate are recorded in the above fashion until the last line of the image has been recorded. Thereafter, the section of the record medium on which the image has been recorded may be appropriately severed by a suitable cutting mechanism provided for the purpose.

In the above description, it was presumed that the data being recorded was low resolution pictorial information, such as printed text, and the higher stepping rate for stepping motor 24 was employed. If the information is high resolution data, the state of line 63 will be opposite that for the recording of low resolution data, so that output line 55 of PROM 53 will be coupled through multiplexer 56 to line 57. Again the same operation described above takes place with the exception that, for a four steps-per-line stepping motor rate, PROM 53 will cause a change in state of line 55 for decimal count values 4, 68, 132, 196 or for every other one of the step values at the higher eight steps/line rate. As a result, the total displacement by which recording medium 32 is advanced during each line is 4Δ or only one-half that (8Δ) for low resolution data, so that the scan lines may be placed closer together to achieve the high resolution record. It should be observed that where there is a change in the resolution of the data, the action of light modulator on laser beam 29 will be such as to impart the appropriate scan line thickness for that particular resolution.

From the foregoing description it will be further appreciated that for changes in the resolution of the data during record mode, the system synchronously switches to the correct stepping motor advance rate and the undesirable banding phenomenon is still avoided. This advantageous feature of the present invention results from the manner in which PROM 53 and multiplexer 56 operate to supply the correct step motor clock rate at the proper time irrespective of whether the system is in the higher rate or lower rate record mode. From FIG. 4, described above it can be seen that each of the steps for the lower step rate of four steps/line, occurring at pulse count values of 4, 68, 132, and 196 are exactly aligned and occur at the same pulse count values for the first, third, fifth and seventh steps for the higher rate of eight steps/line. Thus, there is no horizontal offset for the step locations for any of the scan lines that make up the image, regardless of the speed of advance of the recording medium.

From the foregoing description of the present invention, it will be appreciated that a simplified and low cost recording arrangement may be obtained by a combination of inexpensive record advance components, such as a belt and pulley arrangement coupling a capstan driven record advance apparatus to a conventional stepping motor, and a synchronizing and control system that establishes the advance by the motor for each line in response to a galvo sync signal. Such a scheme has also been shown to provide excellent quality copy and exhibits no raster lines (banding).

While we have shown and described one embodiment in accordance with the present invention, it is understood that the same is not limited thereto but is susceptible of numerous changes and modifications as known to a person skilled in the art, and we therefore do not wish to be limited to the details shown and described herein but intent to cover all such changes and modifications as are obvious to one of ordinary skill in the art.

What is claimed is:

1. In a facsimile recording apparatus, wherein an information recording scanning device is caused to scan a recording medium in line-by-line fashion as said recording medium is advanced in a stepwise manner, so that there are recorded on said recording medium a series of stepwise-diagonal traces of information on which a facsimile recording is composed, the improvement comprising:

first means for generating a first signal representative of the position of said scanning device relative to a prescribed location on said recording medium; and second means, responsive to said first signal generated by said first means, for causing each of the locations of adjacent transitions in the successively recorded traces, resulting from the stepwise advance of said recording medium, to be aligned with one another in the direction of advance of said recording medium.

2. The improvement according to claim 1, wherein said second means includes means for causing each of the locations of adjacent transitions in the successively recorded traces to be aligned with one another in the direction of advance of said recording medium for a plurality of rates of advance of said recording medium.

3. The improvement according to claim 1, wherein said scanning device comprises a galvanometer-mirror deflection device for scanning an optical beam, modulated in accordance with information to be recorded, across said recording medium and wherein said first signal is representative of the beginning position of a line scan by said deflection.

4. The improvement according to claim 3, wherein said apparatus includes a stepping motor-driven, recording medium advance device for advancing said recording medium in said stepwise manner.

5. The improvement according to claim 1, wherein said apparatus includes means for stepwise advancing said recording medium in response to step advance signals applied thereto, and wherein said second means includes:

a memory in which data representative of respective step-advances of said recording medium is stored, and means, responsive to said first signal, for sequentially addressing said memory and causing to be read out therefrom prescribed portions of said data as said scanning system is caused to scan said recording medium, and supplying said data as step advance signals to said stepwise advancing means.

6. The improvement according to claim 2, wherein said apparatus includes means for stepwise advancing said recording medium in response to step advance signals applied thereto, and wherein said second means includes a memory in which data representative of respective step-advance of said recording medium is stored, and means, responsive to said first signal, for sequentially addressing said memory and causing to be read out therefrom those prescribed portions of said data corresponding to the rate of advance of said recording medium, as said scanning system is caused to scan said recording medium, and supplying said prescribed portions of said data as step advance signals to said stepwise advancing means.

7. The improvement according to claim 5, wherein said sequentially addressing means includes a counter to which a series of clock pulses is applied, said counter being enabled by said first signal to count successive ones of said series of clock pulses and the contents of which define an addressed location of said memory.

8. The improvement according to claim 7, further including means for inhibiting the supplying of said prescribed portions of data as step advance signals, while coupling clock pulses of said series of clock pulses as step advance signals to said stepwise advancing means, whereby said recording medium is advanced at the rate at which said clock pulses are applied to said counter.

9. The improvement according to claim 6, wherein said sequentially addressing means includes a counter to which a series of clock pulses is applied, said counter being enabled by said first signal to count successive ones of said series of clock pulses and the contents of which define an addressed location of said memory.

10. The improvement according to claim 9, further including means for inhibiting the supplying of said prescribed portions of data as step advance signals, while coupling clock pulses of said series of clock pulses as step advance signals to said stepwise advancing means, whereby said recording medium is advanced at the rate at which said clock pulses are applied to said counter.

11. The improvement according to claim 5, wherein said apparatus includes a stepping motor-driven, recording medium advance device for advancing said recording medium in said stepwise manner.

12. The improvement according to claim 11, wherein said scanning device comprises a galvanometer-mirror deflection device for scanning an optical beam, modulated in accordance with information to be recorded, across said recording medium and wherein said first signal is representative of the beginning position of a line scan by said deflection device.

13. The improvement according to claim 6, wherein said apparatus includes a stepping motor-driven, recording medium advance device for advancing said recording medium in said stepwise manner.

14. The improvement according to claim 13, wherein said scanning device comprises a galvanometer-mirror deflection device for scanning an optical beam, modulated in accordance with information to be recorded, across said recording medium and wherein said first signal is representative of the beginning position of a line scan by said deflection device.

* * * * *